Feb. 27, 1968     L. M. HUDSON     3,370,905
SYMMETRICAL PHOTOGRAPHIC OBJECTIVE HAVING EIGHT ELEMENTS
Filed Aug. 26, 1964

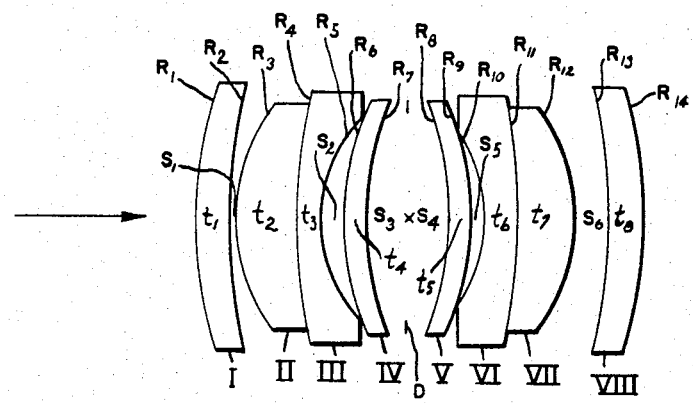

FIG. 1

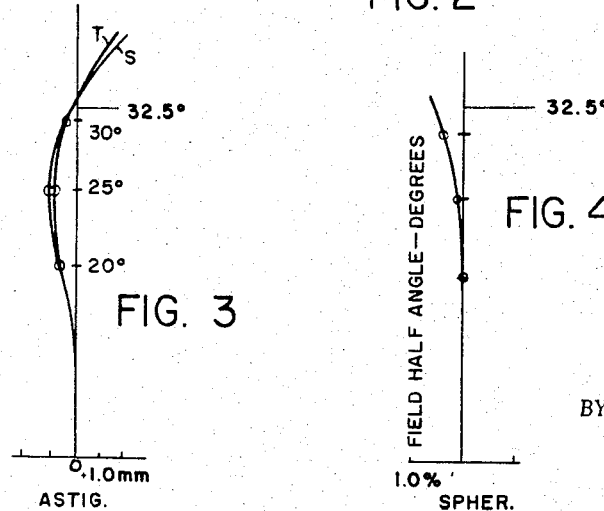

FIG. 2

| E.F. = 100.0 mm | B.F = 62.09mm | F.A. = 65° | f/2.0 | | |
|---|---|---|---|---|---|
| LENS | RADII | THICKNESSES | SPACES | $n_D$ | $\nu$ |
| I | $R_1$ = 83.93 | $t_1$ = 6.90 | | 1.7200 | 42.0 |
| | $R_2$ = 117.03 | | $S_1$ = 0.08 | | |
| II | $R_3$ = 32.11 | $t_2$ = 10.40 | | 1.7200 | 47.5 |
| | $R_4$ = 147.76 | | $S_2$ = 5.40 | | |
| III | $R_5$ = 23.64 | $t_3$ = 2.99 | | 1.6490 | 33.8 |
| IV | $R_6$ = 47.36 | $t_4$ = 4.41 | | 1.6910 | 54.8 |
| | $R_7$ = 58.32 | | $S_3$ = 5.91 | | |
| V | $-R_8$ = 113.48 | $t_5$ = 4.41 | | 1.6910 | 54.8 |
| | $-R_9$ = 50.32 | | $S_4$ = 4.10 | | |
| VI | $-R_{10}$ = 25.32 | $t_6$ = 2.99 | | 1.6680 | 32.3 |
| | $-R_{11}$ = 182.00 | | $S_5$ = 3.94 | | |
| VII | $-R_{12}$ = 33.38 | $t_7$ = 10.40 | | 1.7200 | 47.5 |
| VIII | $-R_{13}$ = 84.72 | $t_8$ = 8.90 | $S_6$ = 5.99 | 1.7440 | 45.6 |
| | $-R_{14}$ = 62.06 | | | | |

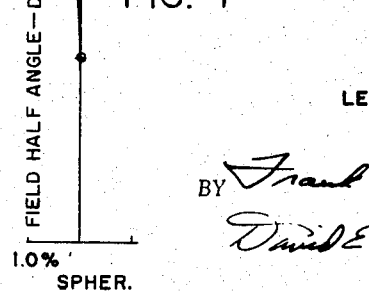

FIG. 3      FIG. 4

LENA M. HUDSON
INVENTOR
BY Frank C. Parker
David E. Dougherty
ATTORNEYS

United States Patent Office 3,370,905
Patented Feb. 27, 1968

3,370,905
SYMMETRICAL PHOTOGRAPHIC OBJECTIVE HAVING EIGHT ELEMENTS
Lena M. Hudson, Brighton, N.Y., assignor to Bausch & Lomb Incorporated, Rochester, N.Y., a corporation of New York
Filed Aug. 26, 1964, Ser. No. 392,256
1 Claim. (Cl. 350—210)

ABSTRACT OF THE DISCLOSURE

A symmetrical photographic objective which is composed of eight lens elements, four of which are disposed on each side of an intervening diaphragm, and the second and third elements counting from the diaphragm outwardly are constructed in the form of a doublet. This photographic objective has all of its refractive surfaces curved concave toward the aforesaid included diaphragm and the image produced by the objective is free of any substantial spherical, chromatic and astigmatic image aberrations through a relatively wide field angle of at least 65°.

---

This invention relates to a photographic objective and more particularly to a photographic objective of the type having six airspaced components.

The photographic objectives according to the present invention may be considered to be a modified Gaussian system which has a relatively wide field angle and excellent light transmitting characteristics. The objectives are substantially symmetrical, however, the curves, thicknesses, airspaces and glasses have been so constructed and arranged to produce exceptionally good correction for spherical and chromatic aberrations, coma, astigmatism, field curvature and distortion. Additionally, the lenses disclosed herein are corrected for an angular field of 65° and have increased light transmission which gives the system an $f/2.0$ speed.

The competitive nature of the lens business makes it highly desirable to produce lenses of superior optical performances while maintaining or reducing the manufacturing costs thereof. Advantageously, the lenses according to the present invention are constructed in a manner which should result in a commercially competitive product. For example, splitting the positive power into six elements instead of four with two elements disposed near the diaphragm and on either side thereof allows a maximum number of oblique rays to be picked up with a minimum diameter. Reducing the diameter also reduces the thicknesses of the lenses to thereby further reduce the cost of the objective. Additionally all of the curves in the system are relatively slight which facilitates manufacturing the elements and tends to reduce the cost of the objective. The mild curves and relatively thin lenses also result in better corrections for astigmatism and curvature of field.

Briefly, an objective lens according to the present invention includes six components. The six components are made up of eight elements which are arranged in a substantially symmetrical arrangement. The first component comprises a single positive lens defining convex concave surfaces. The second component is a negative meniscus lens made up of a positive and a negative element wherein both elements define convex concave surfaces. The third and fourth components are each single positive meniscus lenses which are separated by a diaphragm. The fifth component includes two elements 6 and 7 which form a negative meniscus made up of a positive and a negative element. A single positive lens mades up the sixth component. In the symmetrical arrangement according to the present invention all curves face the central diaphragm. The elements are numbered I to VIII respectively and conform substantially to the data set forth in Table A.

TABLE A $3.4117F < F_I < 4.1699F$
$0.4942F < F_{II} < 0.6040F$
$0.3940F < -F_{III} < 0.4816F$
$2.8189F < F_{IV} < 3.4453F$
$1.1449F < F_V < 1.3993F$
$0.3993F < -F_{VI} < 0.4881F$
$0.4964F < F_{VII} < 0.6068F$
$2.4040F < F_{VIII} < 2.9382F$
$0.0621F < t_1 < 0.0759F$
$0.0940F < t_2 < 0.1144F$
$0.0269F < t_3 < 0.0329F$
$0.0397F < t_4 < 0.0485F$
$0.0397F < t_5 < 0.0485F$
$0.0269F < t_6 < 0.0329F$
$0.0940F < t_7 < 0.1144F$
$0.0801F < t_8 < 0.0979F$
$0.0007F < S_1 < 0.0009F$
$0.0486F < S_2 < 0.0594F$
$0.0532F < S_3 < 0.0650F$
$0.0369F < S_4 < 0.0451F$
$0.0355F < S_5 < 0.0433F$
$0.0539F < S_6 < 0.0659F$ wherein F is the equivalent focal length of the objective, $F_I$ to $F_{VIII}$ are the equivalent focal lengths of the elements I to VIII, $t_1$ to $t_8$ are the axial thicknesses of the elements I to VIII and $S_1$ to $S_6$ are the axial spacings, $S_3$ and $S_4$ being the axial spaces between the central diaphragm D and the front and rear adjacent lenses IV and V respectively.

The lenses according to the presently preferred embodiment of the invention also conform substantially to the conditions set forth in Table B.

TABLE B $1.7150 < n_1 < 1.7250$
$1.7150 < n_2 < 1.7250$
$1.6440 < n_3 < 1.6540$
$1.6860 < n_4 < 1.6960$
$1.6860 < n_5 < 1.6960$
$1.6630 < n_6 < 1.6730$
$1.7150 < n_7 < 1.7250$
$1.7390 < n_8 < 1.7490$
$37.0 < \nu_1 < 47.0$
$42.5 < \nu_2 < 52.5$
$28.8 < \nu_3 < 38.8$
$49.8 < \nu_4 < 59.8$
$49.8 < \nu_5 < 59.8$
$27.3 < \nu_6 < 37.3$
$42.5 < \nu_7 < 52.5$
$40.6 < \nu_8 < 50.6$ wherein $n_1$ to $n_8$ are the indices of refraction from the glass for the yellow spectral line of helium light for the elements I to VIII respectively, and in connection with their color dispersions the numerical value of their respective Abbe numbers are designated by $v_1$ to $v_8$.

The invention will now be described by reference to the drawings; in which,

FIG. 1 is an axial section through an objective system embodying the present invention;

FIG. 2 is a table showing the constructional data for an objective system according to the presently preferred embodiment of the invention;

FIG. 3 is a graphical illustration showing the astigmatism for a lens system according to the presently preferred embodiment of the invention; and FIG. 4 is a graphical illustration showing the distortion of a lens system according to the presently preferred embodiment of the invention.

The distinguishing features of the present invention are achieved by a novel distribution of focal lengths or radii and thicknesses and spacings of the elements set forth herein. For example, the relationship of the radii to the equivalent focal length are shown in Table C.

TABLE C $0.7554F < R_1 < 0.9232F$
$1.0533F < R_2 < 1.2873F$
$0.2890F < R_3 < 0.3532F$
$1.3298F < R_4 < 1.6254F$
$0.2128F < R_5 < 0.2600F$
$0.4262F < R_6 < 0.5210F$
$0.5249F < R_7 < 0.6415F$
$1.0213F < -R_8 < 1.2483F$
$0.4529F < -R_9 < 0.5535F$
$0.2279F < -R_{10} < 0.2785F$
$1.6380F < -R_{11} < 2.0020F$
$0.3004F < -R_{12} < 0.3672F$
$0.7625F < -R_{13} < 0.9319F$
$0.5585F < -R_{14} < 0.6827F$

The presently preferred form of the invention also conforms to the constructional data shown in Table D.

TABLE D $R_1 = 0.8393F$
$R_2 = 1.1703F$
$R_3 = 0.3211F$
$R_4 = 1.4776F$
$R_5 = 0.2364F$
$R_6 = 0.4736F$
$R_7 = 0.5832F$
$R_8 = -1.1348F$
$R_9 = -0.5032F$
$R_{10} = -0.2532F$
$R_{11} = -1.8200F$
$R_{12} = -0.3338F$
$R_{13} = -0.8472F$
$R_{14} = -0.6206F$
$t_1 = 0.0690F$
$t_2 = 0.1040F$
$t_3 = 0.0299F$
$t_4 = 0.0441F$
$t_5 = 0.0441F$
$t_6 = 0.0299F$
$t_7 = 0.1040F$
$t_8 = 0.0890F$
$S_1 = 0.0008F$
$S_2 = 0.0540F$
$S_3 = 0.0591F$
$S_4 = 0.0410F$
$S_5 = 0.0394F$
$S_6 = 0.0599F$

The minus sign designates those lens surfaces which are concave toward entrant light.

The lenses disclosed herein relate to wide angle field photographic objectives of high light transmitting capacity. The systems include six components and eight elements which are arranged in a substantially symmetrical manner. The curves, thicknesses, airspaces and glasses have been chosen in accordance with the tables set forth herein to thereby provide an unusually well corrected lens. The lenses have particularly good correction for spherical and chromatic aberrations, coma, astigmatism, field curvature and distortion. Additionally, the lenses are corrected for an unusually large angular field of 65° as well as having an increased light transmission to thereby provide an f/2.0 speed. The system is related to the Gauss objective, however, the positive power has been split up into six elements in order to increase the field angle. Two of the positive elements are placed near the diaphragm, one on either side. This arrangement allows the system to pick up a maximum amount of oblique rays at the minimum speed. The lenses are also reduced in diameter and thicknesses which tends to improve the correction for astigmatism and curvature of field as well as reducing the cost of the system.

The structural data set forth in Table C leads to an objective form set forth in the following Table E wherein the equivalent focal length is 100 units.

TABLE E $0.7554 < R_1 < 0.9232$
$1.0533 < R_2 < 1.2873$
$0.2890 < R_3 < 0.3532$
$1.3298 < R_4 < 1.6254$
$0.2128 < R_5 < 0.2600$
$0.4262 < R_6 < 0.5210$
$0.5249 < R_7 < 0.6415$
$1.0213 < -R_8 < 1.2483$
$0.4529 < -R_9 < 0.5535$
$0.2279 < -R_{10} < 0.2785$
$1.6380 < -R_{11} < 2.0020$
$0.3004 < -R_{12} < 0.3672$
$0.7625 < -R_{13} < 0.9319$
$0.5585 < -R_{14} < 0.6827$
$0.0621 < t_1 < 0.0759$
$0.0940 < t_2 < 0.1144$
$0.0269 < t_3 < 0.0329$
$0.0397 < t_4 < 0.0485$
$0.0397 < t_5 < 0.0485$
$0.0269 < t_6 < 0.0329$
$0.0940 < t_7 < 0.1144$
$0.0801 < t_8 < 0.0979$
$0.0007 < S_1 < 0.0009$
$0.0486 < S_2 < 0.0594$
$0.0532 < S_3 < 0.0650$
$0.0369 < S_4 < 0.0451$
$0.0355 < S_5 < 0.0433$
$0.0539 < S_6 < 0.0659$

The complete data for the lens system according to the preferred embodiment of the invention is set forth in the accompanying Table F and shown in FIG. 2.

TABLE F

E.F.=100.0 mm.   B.F.=62.09 mm.   F.A.=65°   f/2.0

| Lens | Radii | Thicknesses | Spaces | $n_D$ | $\nu$ |
|---|---|---|---|---|---|
| I | $R_1 = 83.93$<br>$R_2 = 117.03$ | $t_1 = 6.90$ | | 1.7200 | 42.0 |
| | | | $S_1 = 0.08$ | | |
| II | $R_3 = 32.11$<br>$R_4 = 147.76$ | $t_2 = 10.40$ | | 1.7200 | 47.5 |
| III | $R_5 = 23.64$ | $t_3 = 2.99$ | | 1.6490 | 33.8 |
| | | | $S_2 = 5.40$ | | |
| IV | $R_6 = 47.36$<br>$R_7 = 58.32$ | $t_4 = 4.41$ | | 1.6910 | 54.8 |
| | | | $S_3 = 5.91$<br>$S_4 = 4.10$ | | |
| V | $-R_8 = 113.48$<br>$-R_9 = 50.32$ | $t_5 = 4.41$ | | 1.6910 | 54.8 |
| | | | $S_5 = 3.94$ | | |
| VI | $-R_{10} = 25.32$<br>$-R_{11} = 182.00$ | $t_6 = 2.99$ | | 1.6680 | 32.3 |
| VII | $-R_{12} = 33.38$ | $t_7 = 10.40$ | | 1.7200 | 47.5 |
| | | | $S_6 = 5.99$ | | |
| VIII | $-R_{13} = 84.72$<br>$-R_{14} = 62.06$ | $t_8 = 8.90$ | | 1.7440 | 45.6 | wherein $R_1$ to $R_{14}$ are the radii of the lens surfaces, $t_1$ to $t_8$ are the axial thicknesses, $S_1$ to $S_6$ are the axial spacings; and wherein $n_D$ is the index of refraction and $\nu$ is the Abbe number of elements 1 to 8 respectively.

While the invention has been described hereinabove in terms of an example which embodies it, the scope of the invention itself is defined by the accompanying claim.

What is claimed is:

1. An objective lens comprising six axially aligned air-spaced components, a first one of said components comprising a single positive lens defining convex concave surfaces, a second component comprising a negative meniscus lens including a positive and a negative element having matched surfaces and disposed with said surfaces in optical contact with each other, a third and a fourth component each comprising a positive meniscus lens and a diaphragm separating said third and fourth components, a fifth component comprising a negative meniscus lens including a positive and a negative element having matching surfaces disposed in optical contact with each other, and a sixth of said components comprising a single positive lens, all of the lens surfaces of all lenses being concave toward said diaphragm and said elements conforming substantially to the following conditions:

E.F.=100.0 mm.   B.F.=62.09 mm.   F.A.=65°   f/2.0

| Lens | Radii | Thicknesses | Spaces | $n_D$ | $-\nu$ |
|---|---|---|---|---|---|
| I | $R_1 = 83.93$<br>$R_2 = 117.03$ | $t_1 = 6.90$ | | 1.7200 | 42.0 |
| | | | $S_1 = 0.08$ | | |
| II | $R_3 = 32.11$<br>$R_4 = 147.76$ | $t_2 = 10.40$ | | 1.7200 | 47.5 |
| III | $R_5 = 23.64$ | $t_3 = 2.99$ | | 1.6490 | 33.8 |
| | | | $S_2 = 5.40$ | | |
| IV | $R_6 = 47.36$<br>$R_7 = 58.32$ | $t_4 = 4.41$ | | 1.6910 | 54.8 |
| | | | $S_3 = 5.91$<br>$S_4 = 4.10$ | | |
| V | $-R_8 = 113.48$<br>$-R_9 = 50.32$ | $t_5 = 4.41$ | | 1.6910 | 54.8 |
| | | | $S_5 = 3.94$ | | |
| VI | $-R_{10} = 25.32$<br>$-R_{11} = 182.00$ | $t_6 = 2.99$ | | 1.6680 | 32.3 |
| VII | $-R_{12} = 33.38$ | $t_7 = 10.40$ | | 1.7200 | 47.5 |
| | | | $S_6 = 5.99$ | | |
| VIII | $-R_{13} = 84.72$<br>$-R_{14} = 62.06$ | $t_8 = 8.90$ | | 1.7440 | 45.6 | wherein $R_1$ to $R_{14}$ are the radii of the radii of the lens surfaces the minus (—) signs indicating that these surfaces are concave toward the front of the objective, $t_1$ to $t_8$ are the axial thicknesses of lens elements I to VIII, $S_1$ to $S_6$ are the axial spacings wherein $S_3$ and $S_4$ are the axial distances from the diaphragm D to lenses IV and V respectively; and wherein $n_D$ is the index of refraction and $\nu$ is the Abbe number of elements I to VIII respectively of the glasses used in said lenses.

References Cited
UNITED STATES PATENTS 3,006,249   10/1961   Mandler _____ 350—210

DAVID H. RUBIN, *Primary Examiner.*

JEWELL H. PEDERSEN, *Examiner.*

R. J. STERN, *Assistant Examiner.*